No. 676,917. Patented June 25, 1901.
J. D. SALTS.
CORN PLANTER.
(Application filed July 28, 1900.)

(No Model.) 2 Sheets—Sheet 1.

Witnesses
Inventor:
J. D. Salts,
by
Attorneys

THE NORRIS PETERS CO., PHOTO-LITHO., WASHINGTON, D. C.

No. 676,917. Patented June 25, 1901.
J. D. SALTS.
CORN PLANTER.
(Application filed July 28, 1900.)
(No Model.) 2 Sheets—Sheet 2.
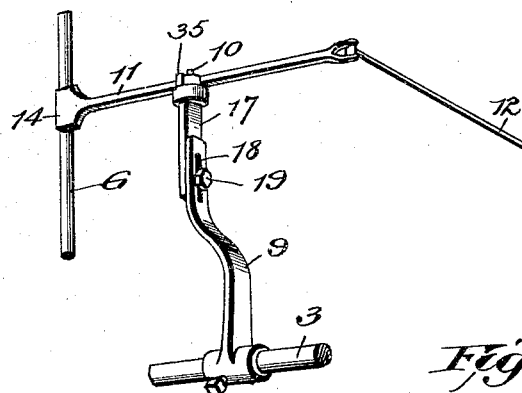
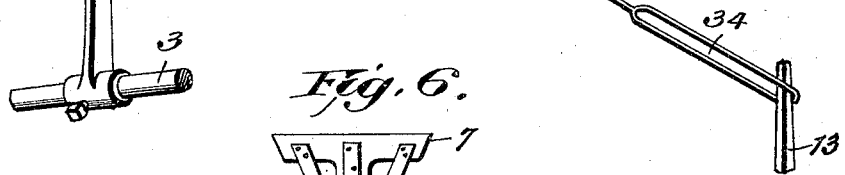
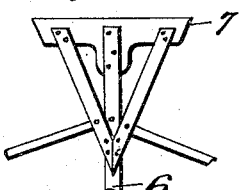
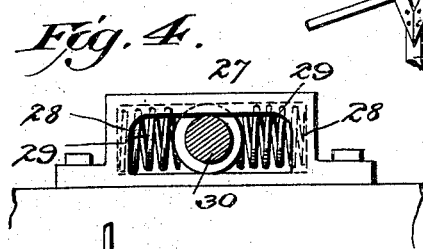
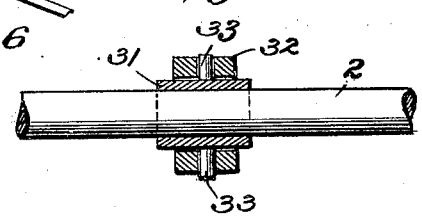
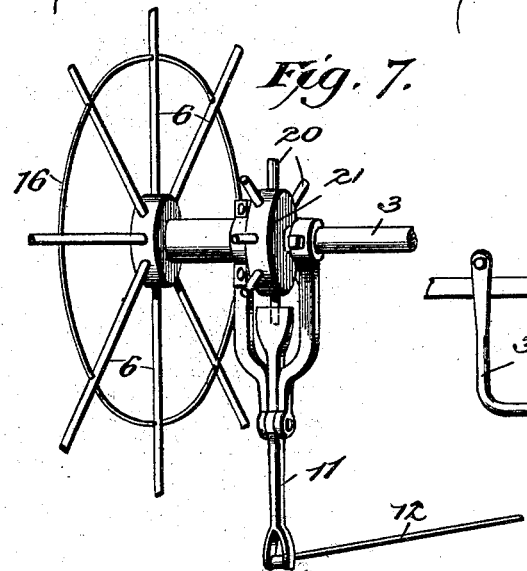
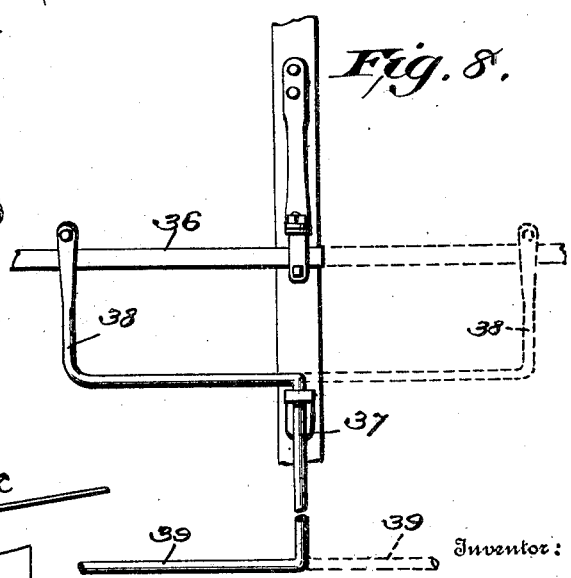
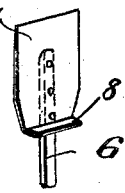
Witnesses:
Inventor:
J. D. Salts,
by
Attorneys

UNITED STATES PATENT OFFICE.

JAMES DAVID SALTS, OF BOIS D'ARC, MISSOURI.

CORN-PLANTER.

SPECIFICATION forming part of Letters Patent No. 676,917, dated June 25, 1901.

Application filed July 28, 1900. Serial No. 25,151. (No model.)

*To all whom it may concern:*

Be it known that I, JAMES DAVID SALTS, a citizen of the United States, residing at Bois D'Arc, in the county of Greene and State of Missouri, have invented a new and useful Corn-Planter, of which the following is a specification.

My invention relates to corn-planters, and has for its objects to provide an ordinary corn-planter with mechanism for automatically operating the dropping mechanism of the planter so as to deposit the hills in rows across the field as the planter advances and to have the hills of the different rows register with each other, and thus form rows across the field at right angles to the rows formed by the progress of the planter. The mechanism is so constructed that it can be thrown out of operation at any time, as in turning at the ends of the rows or for traveling upon roads.

As the usual wire check-row mechanism is dispensed with, I call my improvement a "wireless check-row attachment."

With these objects in view my invention consists in the improved construction and novel arrangement of parts of a check-row attachment for corn-planters, as will be hereinafter more fully set forth.

Figure 1:
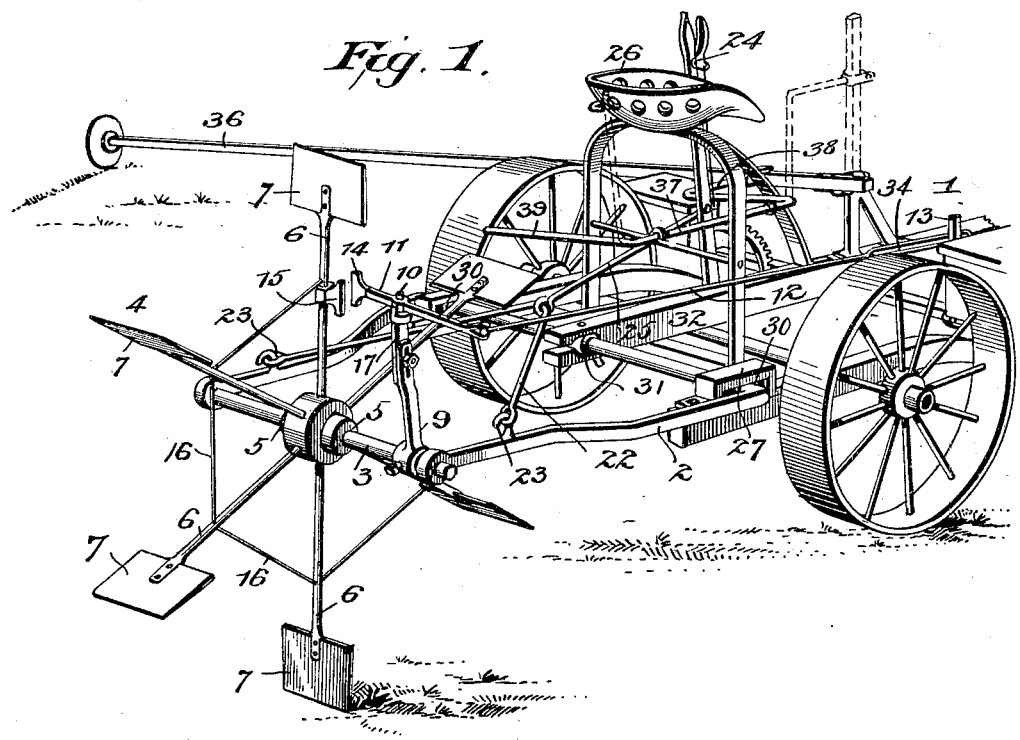
Figure 2:
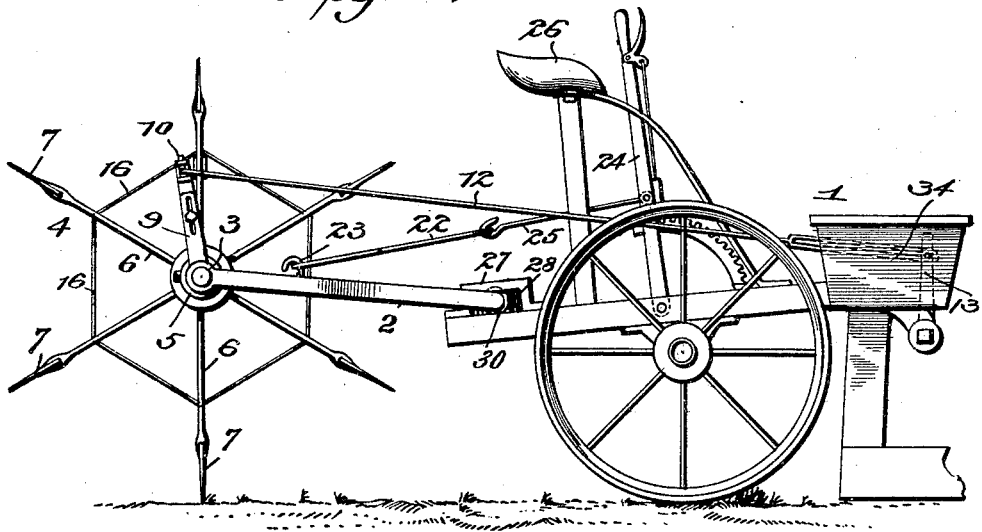

In the accompanying drawings, in which the same reference-numerals indicate corresponding parts in each of the views in which they occur, Figure 1 is a rear perspective view of a corn-planter provided with my check-row attachment. Fig. 2 is a side view of the same, some of the parts of the planter being omitted for the sake of clearness. Fig. 3 is an enlarged detail perspective view of the trip mechanism. Fig. 4 is a longitudinal sectional view through one of the supports for the frame of the attachment. Fig. 5 is a similar view through the mechanism for supporting the central part of the frame, and Figs. 6, 7, 8, and 9 are detail views.

Referring more particularly to the drawings, 1 indicates a corn-planter, which may be of any usual construction provided with furrow-openers and dropping mechanism. Secured to the rear portion of the frame of the planter is a frame 2, preferably substantially U-shaped, at the rear end of which is secured a shaft 3. A spacing-wheel 4 is loosely mounted upon the shaft in any suitable manner, as between collars 5, only one of which is shown, and has the outer ends of its spokes 6 provided with blades or markers 7. The blades may be of any suitable length and are arranged transversely of the line of travel of the machine, so that as the wheel is moved forward the blades will readily enter the ground and cause the wheel to revolve. The blades may all be of the same size or one or more of them may be larger than the others, and, if desired, they may be provided with a stop 8, formed by bending the inner end of the blade at right angles to the remaining portion.

Rigidly secured adjacent to the side of the wheel is the tripping mechanism, which may consist of a standard 9, which is rigidly secured to the shaft 3 and has its upper end provided with a pivot 10, upon which is mounted a cross-arm or tripping-bar 11. One end of the bar 11 is arranged to stand in the path of the spokes of the wheel 4, so as to be engaged thereby as the wheel is rotated. The opposite end of the bar or lever is connected with the dropping mechanism in any suitable manner—as, for instance, by means of a wire 12, which engages with an upright 13, which is connected with and operates the dropper-plates in any usual manner, and is therefore not shown, as it forms no part of my invention. The end of the lever which engages with the spokes of the wheel may be enlarged or provided with a wearing-plate 14, and one or more of the spokes may be provided with blocks or projections 15 in position to engage with the lever 11 instead of having the lever engage with the spokes direct.

The spacing-wheel may be constructed of any desired size and the spokes arranged at any desired distance apart, care being taken to not space them so far apart that the engagement of their outer ends with the ground will produce too great a vertical movement or to permit of the wheel stopping and sliding as it passes from one spoke to the other. Any suitable brace 16 may be used from one spoke to the other to give the wheel the necessary rigidity to permit of its passing over the field. When the outer ends of the spokes are placed at a distance from each other equal to the distance that the hills are to be deposited in the rows, the tripping-lever is caused to engage with every spoke, and thereby deposit the hills in their proper positions along the row; but if it be desired to adapt the wheel for drilling corn, as well as dropping it in hills, the spokes of the wheel may be increased in number and the lever be arranged to engage with each one, when the corn will be drilled, or a portion of the spokes can be provided with projections at such distances apart as to correspond with the distance apart that it is desired to drop the corn and arrange the lever to only engage with said projection, and thereby deposit the corn in hills.

If desired, the lever may be adjusted radially respectively to the wheel by forming the standard in two parts, the outer part of which, 17, may be slotted longitudinally, as shown at 18, and adjustably secured in position by means of a bolt 19, and instead of having the tripping-lever engage directly with the spokes or the projections thereon the wheel may be provided with supplemental spokes 20, which may be secured directly to the hub of the wheel 4 or project from a disk 21, which is secured thereto. Instead of pivotally securing the lever above the shaft at right angles to the plane of the spacing-wheel the standard may be inverted, or the lever may be pivotally mounted upon the frame of the wheel below the shaft in position to be moved in a plane parallel with the plane of the wheel. In this construction the upper end can be provided with any suitable means for engaging with the spokes of the wheel or the supplemental spokes, as above described.

The frame 2 is pivotally mounted upon the frame of the planter, so that its rear end and the wheel may be moved vertically, so as to prevent the wheel from coming in contact with the ground, and thereby prevent its rotation and the operaton of the tripping mechanism. One means for accomplishing this is a substantially V-shaped bail 22, which is pivotally connected at its rear end with the frame 2, as by means of hooks 23. The forward end of the bail is connected with a lever 24 by means of a link or rod 25. The lever is located adjacent to the driver's seat 26 and is provided with the usual curved rack and detent for retaining it in any desired position. The ends of the forward cross-bar of the frame are preferably loosely mounted in boxing 27, within which are placed springs 28, the sides of the top of the boxing being flanged, as shown at 29, to retain the springs therein.

If desired, a suitable collar 30 may be placed upon the bar of the frame within the boxing for engaging with the springs. The central portion of the front bar of the frame is provided with a collar 31, which is pivotally secured at the rear end of a bar 32 by means of pivots 33. The forward end of the bar 32 is secured to the front portion of the machine, as to the tongue, and is preferably bifurcated at its rear end, within which the collar 31 is mounted, with the pivots 33 arranged vertically. When arranged in this manner, it is evident that the central portion of the front bar of the frame cannot move longitudinally of the planter, but its ends are free to oscillate back and forth in the boxings 27, thereby permitting of a sufficient horizontal movement of the frame 2 to permit of the wheel adapting itself to the surface of the ground over which it is passing without varying or changing the position in which the hills of corn are deposited and rendering the attachment peculiarly adapted for use upon all kinds of ground and under varying conditions. At the same time the vertical movement of the frame and wheel is left perfectly free by reason of the pivotal engagement of the front bar of the frame with its supports, the bar being cylindrical in cross-section or provided with cylindrical bearings where it engages with said supports. This construction permits of the wheel adapting itself vertically to the ground and also permits of its being raised out of contact therewith by means of the lever 24. To prevent the vertical and forward motion of the frame and the tripping-lever when the frame is swung upon its pivots from interfering with the action of the dropping mechanism, I prefer to form the forward end of the dropping-wire 12 with an elongated loop 34, which will permit of the wire or rod moving forward when the wheel is thrown out of operation without interfering with its engagement with the upright 13. But as soon as the spacing-wheel has been lowered to put the machine in operation the wire will be drawn back, so as to cause the forward portion of its loop to engage with and operate the dropping mechanism, as before. A shoulder or stop 35 may be arranged upon the top of the standard 9 to engage with the tripping-lever and limit its return movement after it has been swung upon its pivot by the engagement with its outer end by one of the spokes of the spacing-wheel, the return movement of the lever being preferably effected by means of the spring-actuated dropping mechanism.

As it is necessary to have the rows formed by the dropper equally spaced from each other, a marker 36 is generally used, which is pivotally secured to the frame at one end and has its outer end provided with suitable means—as, for instance, a wheel or crosshead—arranged to make a mark or line across the field, which is followed by the machine upon its return trip. This marker is generally swung upon its pivot by hand at the ends of the rows, so as to project from one side or the other of the machine, according to which side of it it is desired to make the mark.

To avoid the necessity of operating the marker by hand, I prefer to journal a shaft or rod 37 longitudinally upon the machine, preferably in line with the pivotal point of the marker, with its forward end bent into the form of a crank 38, which engages with the marker at a suitable distance from its pivotal point. The rear end of the rod is bent at right angles thereto in alinement with the crank at the opposite end, as shown at 39, and is adapted to be connected with the seat in any suitable manner and hold it in a vertical position. When constructed in this manner, it is evident that whenever it is desired to raise the marker from the ground, as in turning at the end of a row, the driver only needs to reach down and catch hold of the rear end of the rod and swing it up into engagement with the seat or other point of attachment and secure it thereto. The rotation of the rod will cause the crank at the forward end to swing the marker into a vertical position, where it is retained until after the rear end has been released from its point of attachment and turned to one side or the other to throw the marker into position for the return trip.

After the machine has made one or more trips across the field it is necessary that the spacing-wheel and planter be so arranged that on the return trip each hill of corn will be deposited in such position as to register with the hills that have already been deposited. If the spacing-wheel is of such a size that the engagement of each spoke with the ground drops a hill, then it is only necessary that any one of the spokes of the wheel be set or arranged to register with the last mark formed by the spokes at the ends of the preceding rows; but where the dropping mechanism is not arranged to be operated simultaneously with the engagement of the spokes with the ground, or where the dropping mechanism is arranged to be operated when only one or a portion of the spokes engage with the ground, it is necessary that the marker be so adjusted that on the return trip the dropping mechanism will be operated at the proper time. By providing the desired spokes with the stop or indicator the contact of such stop with the ground will make a different impression from the other spokes, and thus enable the attendant of the machine to determine the proper location of the spokes of the wheel relatively to said mark for the return trip. The spokes may be painted of different colors or provided with characters to assist in the proper arrangement of the wheel for the return trip.

As above described, it will be seen that my improved attachment can be secured to the ordinary corn-planter in such position, preferably to the rear, that it will operate the mechanism at the desired times to produce a perfect arrangement of the hills, so that the ground can be easily cultivated in both directions, or it may be easily adapted for depositing it in drills, so that it can only be cultivated in one direction. By permitting of the flexible movement of the wheel-frame the wheel will readily adapt itself to the condition of the ground over which it is passing and will permit of the planter being moved forward with any desired amount of speed without interfering with the perfect operation of my attachment. The wide point of contact with the ground secured by making the width of the blades or length of the knives or feet at the ends of the spokes, preferably from one to two feet, will assist in holding the wheel in a vertical position, and thereby cause it to run perfectly true and always operate the tripping-lever at the proper instant.

By providing means convenient to the reach of the driver for throwing the spacing-wheel into and out of engagement and also for operating the marker without having to get off the planter at the ends of the rows the amount of land that can be planted by the use of my improved attachment is considerably increased over what can be done with the ordinary wire check-row attachment, which must be changed and adjusted relatively to the machine at each row.

My attachment is simple, strong, and durable and can be manufactured very cheaply and applied to the ordinary dropper by any one conversant with the use and operation of such machines without requiring the services of a skilled or experienced person.

Having thus fully described my invention, what I claim as new, and desire to secure by Letters Patent, is—

1. In a check-row attachment for corn-planters, the combination, with a frame, of two flanged boxings for securing the same to the rear of the planter, a spring in the boxing, a swiveled boxing for securing the frame in position to permit of movement in a horizontal plane, a spacing-wheel journaled in the rear end of the frame, a tripping-lever adjacent thereto, and means for connecting said lever with the dropping mechanism of the planter, substantially as described.

2. In a corn-planter, the combination, with the frame thereof, of a boxing secured to each side of said frame, a spring in each boxing, a bar secured to the tongue of the machine, the rear end of which is bifurcated, a boxing pivotally secured within said bifurcation, a frame to the rear of the planter, the forward bar of which is mounted in said boxings, a spacing-wheel journaled in the rear end of said frame, a tripping-lever adjacent thereto, and means for connecting said tripping-lever with the dropping mechanism of the planter, substantially as described.

3. In a check-row attachment for corn-planters, the combination with a horizontally-disposed frame, of a vertically-positioned spacing-wheel mounted in said frame, the ends of the spokes of which are each provided with means for engaging with the ground, and one or more of which is provided with a stop, a standard raised vertically from said frame and provided at its upper end with a pivot, a lever intermediately mounted upon said pivot and having one of its ends in position to be engaged by the stop carried by the spoke of the spacing-wheel, said lever being horizontally disposed, and a connection between the opposite end of the lever and the dropping mechanism of the planter, substantially as described.

4. In a check-row attachment for corn-planters, the combination with a frame, of a vertically-disposed spacing-wheel mounted therein and having spokes provided at their ends with means for engaging with the ground and one or more of which is provided with stop, a two-part standard raised vertically from said frame, means for adjustably securing the two parts of said standard together, a horizontally-disposed lever intermediately pivoted upon the upper end of said standard and having one of its ends disposed in the path of the stop carried by the spoke of the spacing-wheel, and a connection between the opposite end of said lever and the dropping mechanism of the planter, substantially as described.

5. In a check-row attachment for corn-planters, the combination of a centrally-swiveled frame, elastic means disposed at the ends of the frame, a spacing-wheel mounted upon said frame, and means operated by said spacing-wheel for actuating the dropping mechanism of the planter, substantially as described.

JAMES DAVID SALTS.

Witnesses:
J. H. ELSON,
W. E. REDFEARN.